United States Patent

[11] 3,593,748

[72] Inventor  Helmut Teerling
              Bad Godesberg, Germany
[21] Appl. No. 844,292
[22] Filed     July 24, 1969
[45] Patented  July 20, 1971
[73] Assignee  Langen & Company
[32] Priority  Aug. 1, 1968
[33]           Germany
[31]           P 17 80 103.5

[54] PRESSURE RESERVOIR FOR HYDROPNEUMATIC RESILIENT SUSPENSIONS FOR VEHICLES
4 Claims, 1 Drawing Fig.

[52] U.S. Cl. .................................................. 138/30,
                                                   92/99, 267/65
[51] Int. Cl. ................................................. F16l 55/04
[50] Field of Search .......................................... 138/30;
                                        267/64, 65; 92/98 RD, 99

[56]                References Cited
                UNITED STATES PATENTS
   329,119  10/1885  Ball et al. .................... 92/99
 2,134,072  10/1938  Christensen ................ 92/98 (R D)
 3,428,091   2/1969  Sugimura et al. ............ 138/30

Primary Examiner—Houston S. Bell, Jr.
Attorney—Holman & Stern

ABSTRACT: A pressure reservoir for hydropneumatic resilient suspensions for vehicles in which the interior of a housing constituting the reservoir is divided by a movable deflectable separating wall or partition into a gas chamber and a liquid chamber and a part of the gas volume present at a certain pressure is excluded for the attainment of a steeper characteristic resilient curve when the certain pressure is reached.

PATENTED JUL 20 1971
3,593,748
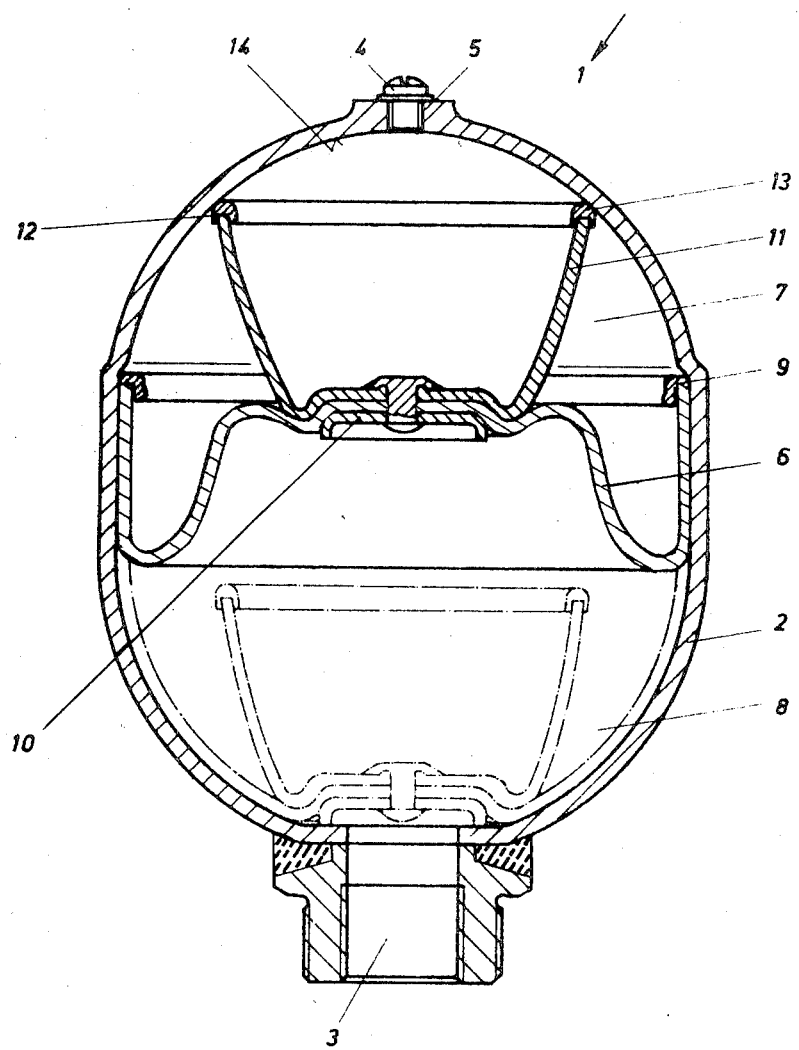
INVENTOR
HELMUT TEERLING
BY Holman, Glascock, Downing
& Seebold
ATTORNEYS 3,593,748

PRESSURE RESERVOIR FOR HYDROPNEUMATIC RESILIENT SUSPENSIONS FOR VEHICLES

BACKGROUND OF THE INVENTION

Hydropneumatic resilient suspensions as such have been known for a long time to the industry and among other things an advantage thereof resides in the fact that very "soft" resilient characteristics can be achieved thereby improving riding comfort. On the other hand, there is a danger associated with such resilient characteristics in that the suspension system "bottoms out" when strong dynamic forces are applied. German Pat. No. 1,064,355 discloses an assemblage which attempts to avoid this disadvantage and it is predicated on the concept that the characteristic resilient curve is steeper when a part of the total gas volume is excluded and that a hydropneumatic stop is accomplished when the rest of the volume is properly selected.

In the known assemblage, this exclusion is achieved in that the movability of a flexible separating wall, such as a diaphragm, is restricted between the two gas volumes toward one or both directions by limiting walls so that the active connection between the gas volumes is interrupted after the diaphragm rests against one of the limiting walls. This system is disadvantageous in that a second separating wall or partition between the gas volumes is added to the first separating wall or partition between the liquid and gas. This makes the assembly complex and increases the cost particularly in view of the fact that one additional limiting wall of relatively stiff material must be mounted and fastened.

In contrast thereto, it is the salient object of the present invention to provide a pressure reservoir of the type under consideration which enables the exclusion of a gas volume with the same number of components and at the same cost as involved for convention hydropneumatic resilient suspensions with only slightly increased overall expenditures. To accomplish this end, conventional pressure reservoir designs should be largely utilized.

SUMMARY OF THE INVENTION

According to the invention, the problem is solved in that the half of the pressure reservoir housing or casing opposite the liquid inlet is essentially the shape or configuration of a spherical cup and that within the gas chamber, a cup having a circular rim or periphery of a material stronger than that of a seperating wall or partition is tightly connected to the separating wall so that, upon deflection of the separating wall is tightly joined to the wall whereby upon deflection of the wall and after the rim or periphery makes contact with the housing half, a pressure equalization between the gas volume enclosed by the cup and the gas volume surrounding the cup does not occur or occurs only after a longer period of time.

In a preferred embodiment of the invention, the edge or rim of the cup may be provided with deformable sealing material and the cup is riveted or otherwise secured to a cover plate which prevents the separating wall or partition from moving outwardly through the liquid inlet. In order to assure that the cup rests securely against the housing half, the separating wall or partition may be so shaped that the cup approaches the housing half or spherical cup configuration in a relaxed position of the separating wall.

Further objects and advantages of the invention will become more readily apparent to persons skilled in the art from the following detailed description and annexed drawings and in which drawings:

BRIEF DESCRIPTION OF THE DRAWINGS

The sole FIGURE is a vertical sectional view of a pressure reservoir embodying the present invention

DETAILED DESCRIPTION OF THE INVENTION

A pressure reservoir 1 includes a housing or casing 2 provided with an inlet 3 through which liquid is introduced into the housing and an inlet 5 for gas which is closed by a screw 4. A separating wall or partition 6 divides the interior of the housing 2 into a gas chamber 7 and a liquid chamber 8. A retaining ring 9 is utilized for tightly fastening the wall or partition 6 to the housing 2. A cover plate 10 prevents destruction of the wall or partition 6 by the wall moving into the inlet 3.

A cup 11 is disposed on the side of the wall or partition 6 which faces the gas chamber 7 with the cover plate 10 and cup 11 being fastened together by means of rivets or screws while at the same time clamping the wall or partition 6. The cup is formed with a circular edge or rim 12 provided with a deformable sealing material 13 and half 14 of the housing 2 which is opposite the inlet 3 is in the shape of a spherical cup.

The operation of the pressure reservoir is as follows:

The position of the wall or partition 6 as illustrated by the dot dash lines represents the condition of the pressure reservoir 1 when not charged with fluid. When attached to a resilient suspension cylinder of a vehicle (not shown), some fluid enters the housing 2 so that the separating wall or partition 6 is raised or lifted off the housing. As the resilient suspension cylinder balances out, the pressure reservoir fills with more fluid so that an enlargement of the liquid chamber 8 results. The increase in pressure follows the gas laws during this process and if the resilient motions are of great magnitude, the gas chamber 7 ultimately becomes so small that the edge or rim 12 having the sealing material 13 touches or contacts the half 14 of the housing 2. Since the half 14 is in the shape of a spherical cup and since the edge or rim 12 is circular, a circular line of contact is established even if the cup 11 is disposed at an angle to the axis of the reservoir 1. Accordingly, at the moment of complete contact or engagement between the edge or rim 12 and the half 14 of the housing, there is a separation of the gas volume enclosed by the cup 11 from the remainder of the gas volume within the gas chamber 7. The characteristic curve of the pressure reservoir which progresses initially with the progressivity in accordance with the gas laws becomes considerably steeper following this separation thereby meaning that the increase in pressure per liquid volume stored becomes considerably greater than without the separation.

Small deviations in the geometrical configurations of the spherical cups or of the circle which may be caused by manufacturing tolerances are compensated for by the deformable sealing material 13. Due to the configuration of the cup 11, various characteristic curves can be obtained with the pressure reservoir 1 otherwise remaining the same. It is possible not only to shift the break in the characteristic curve but also to realize various steepnesses of the characteristic curve after the break. In order to make it easier for the wall or partition 6 to touch the edge 12 safely at the half 14 of the housing 2, the initial shape of the wall or partition 6 may be such as to prevent its undefined deflection.

Of course the invention is not limited to the embodiment illustrated. It is possible for the pressure reservoir to be defined by two separate housing halves joined together by screws, welding or the like and the type of fastening of the wall or partition may be varied. The material for the cup should be lightweight so as to maintain the inertial forces low and its configuration should be so selected that sharp corners and edges are avoided since such corners or edges may result in a rapid destruction of the separating wall or partition. It should further be noted that the pressure reservoir need, by no means, be separated from the resilient suspension cylinder but rather the pressure reservoir and suspension cylinder may constitute one unit.

This invention is not to be confined to any strict conformity to the showings in the drawings but changes or modifications may be made therein so long as such changes or modifications mark no material departure from the spirit and scope of the appended claims.

I claim:

1. A pressure reservoir for hydropneumatic resilient suspensions of vehicles of the type having a housing, a deflectable partition dividing the interior of the housing into a gas chamber and a liquid chamber, inlets for introducing gas and liquid into the interior of the housing, the inner area of the half of the housing opposite the inlet for the liquid having essentially the shape of a spherical cup, a cup provided with a circular edge of a stronger material than the material of the partition tightly joined to the partition with its open end facing the gas inlet whereby, upon liquid entering the partition liquid inlet, the partition is deflected away from the liquid inlet and after the circular edge of the cup makes complete contact with the said half of the housing, the gas volume enclosed by cup is separated from the remaining gas volume in the gas chamber whereby the characteristic resilient curve becomes considerably steeper after such separation so that an increase in pressure per liquid volume stored becomes considerably greater.

2. The pressure reservoir for hydropneumatic resilient suspensions of vehicles as claimed in claim 1 in which the edge of said cup is provided with a deformable sealing material.

3. The pressure reservoir for hydropneumatic resilient suspensions of vehicles as claimed in claim 1 including a cover plate disposed against the side of the partition opposite the said cup, means securing the cup and cover plate together with the partition clamped therebetween and said cover plate preventing said partition from moving into the inlet for the liquid.

4. The pressure reservoir for hydropneumatic resilient suspensions of vehicles as claimed in claim 1 in which said partition is so shaped that said cup approaches said housing half when said partition is in a relaxed position.